Jan. 25, 1949.  H. T. HIGGINS  2,459,938

SAFETY CONTROL DEVICE FOR MOTOR VEHICLES

Filed Feb. 17, 1945  5 Sheets-Sheet 1

INVENTOR.
HAROLD T. HIGGINS.
BY
Spear, Rawlings & Spear
ATTORNEYS.

INVENTOR.
HAROLD T. HIGGINS.
BY
Spear, Rawlings & Spear
ATTORNEYS.

Jan. 25, 1949.  H. T. HIGGINS  2,459,938
SAFETY CONTROL DEVICE FOR MOTOR VEHICLES
Filed Feb. 17, 1945  5 Sheets-Sheet 3

INVENTOR.
HAROLD T. HIGGINS,
BY
Spear, Rawlings & Spear.
ATTORNEYS.

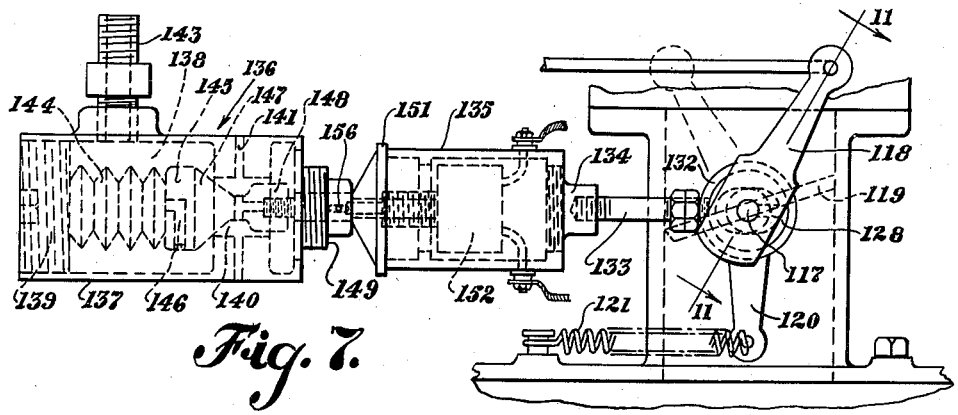
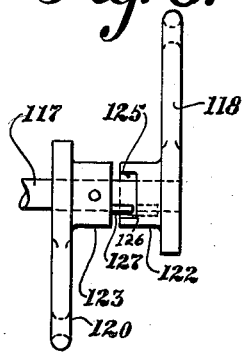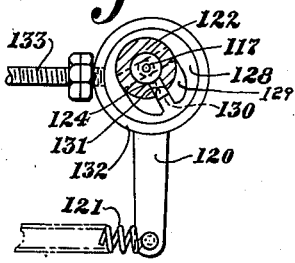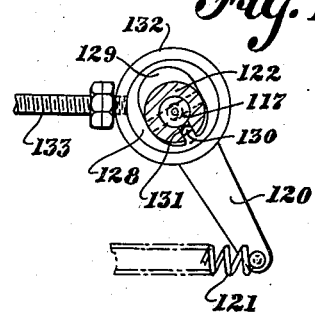
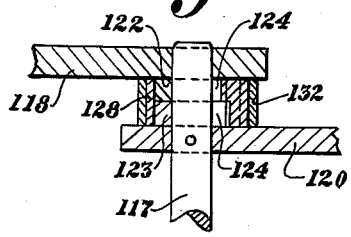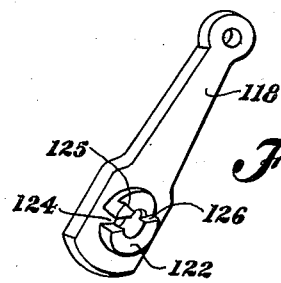

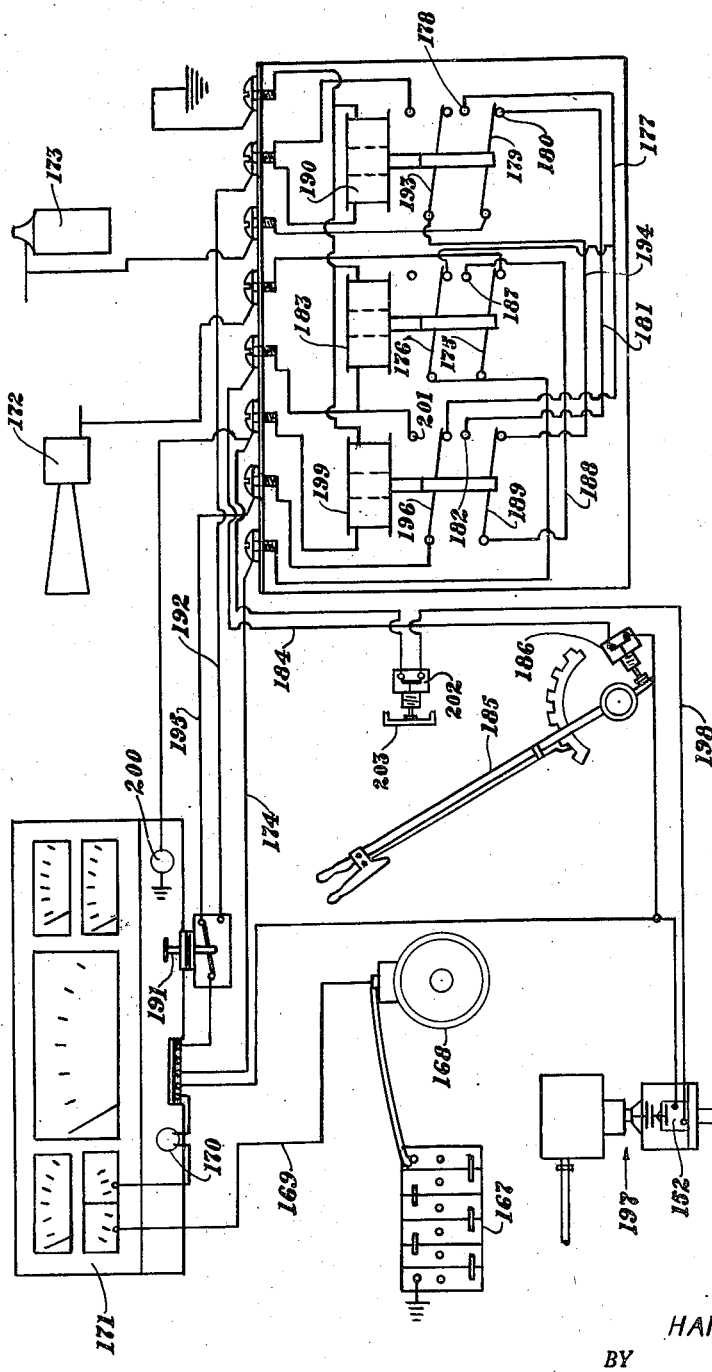

Patented Jan. 25, 1949

2,459,938

UNITED STATES PATENT OFFICE 2,459,938

SAFETY CONTROL DEVICE FOR MOTOR VEHICLES

Harold T. Higgins, Boston, Mass.

Application February 17, 1945, Serial No. 578,532

16 Claims. (Cl. 192—3)

My present invention relates to a control device for use in so connecting a pair of members in the means by which the throttle valve of an engine is actuated that normal acceleration is possible only when a predetermined pressure exists at the source of brake operated power developed and maintained by the compressor driven by the engine.

Consideration of a number of accidents involving vehicles, particularly busses, equipped with power operated brakes leads me to the conclusion that, in many instances, the cause of the accidents was the fact that the vehicle was operated at a time when the pressure at the source was below a minimum safe brake operating pressure. The lack of adequate brake operating pressure may sometimes be attributed to the use of the vehicle before the compressor had built up the pressure at the source to a safe level. Sometimes the lack of a safe operating pressure is due to leaks or breaks in the pressure lines.

While most pressure brake systems have a pressure indicator, such in no way controls the operation of the vehicle and the operator, through carelessness, or because of other duties, may fail to notice the indicator at crucial times or he may ignore the fact that the indicator shows that it is unsafe to operate the vehicle.

In accordance with my invention, I provide a device comprising a unit connecting a pair of throttle valve actuating members and pressure operable means by which the connecting unit is rendered operative in response to a predetermined minimum pressure at the source of brake operating pressure and is rendered inoperative to thereby prevent normal acceleration when the pressure at the source drops below that predetermined minimum. When the device is operative, the pair of members are interconnected as a unit but when it is inoperative, the members have limited movement relative to each other to decrease the extent to which the throttle valve may be opened as the accelerator pedal is depressed by the operator.

In addition to this control of the throttle valve, which by itself immediately renders impossible normal operation of the throttle valve unless adequate brake operating pressure is available, my invention may also provide controls for the engine circuits. By these controls, such circuits are opened when only an inadequate pressure is available to operate the brakes. These circuits cannot be closed until adequate brake operating pressures are available except when certain safety precautions are observed. For example, the engine may be started and run, when the parking brake is applied, at sufficient R. P. M. to develop adequate brake operating pressure at the source or to permit the movement, in emergencies, of the vehicle at a slow rate of speed to a safe place.

My invention is capable of various embodiments making it adaptable to various brake operating systems and to provide a wide range of safe controls for the vehicle. In the accompanying drawings, I have shown several characteristic embodiments of my invention from which its many novel features and advantages will be readily apparent.

In the drawings:

Fig. 7 shows a modification of my invention adapted for use when the pair of members to be connected are a shaft and a shaft rotating arm actuated by the accelerator pedal.

Fig. 8 shows, in elevation, the spring controlled arm fast on the shaft, the arm actuated by the accelerator pedal and the means by which the arms are interconnected after predetermined partial rotation of the accelerator actuated arm relative to the shaft when an inadequate brake operating pressure exists at the source.

Fig. 9 is a fragmentary and partly sectioned end view of the connecting unit of Fig. 7 when inoperatively positioned by the power operated means.

Fig. 10 shows, in a similar view, the connecting unit of Fig. 7 when operatively positioned by the power operated means.

Fig. 11 is a section along the lines 11—11 of Fig. 7.

Fig. 12 shows one of the arms in elevation.

Fig. 15 is a schematic view showing a typical installation in accordance with my invention utilizing the device of Fig. 7, and Fig. 16 is a fragmentary view indicating the use of a device of the type shown in Figs. 2–5 in the installation of Fig. 15.

Introduction

Figure 1:
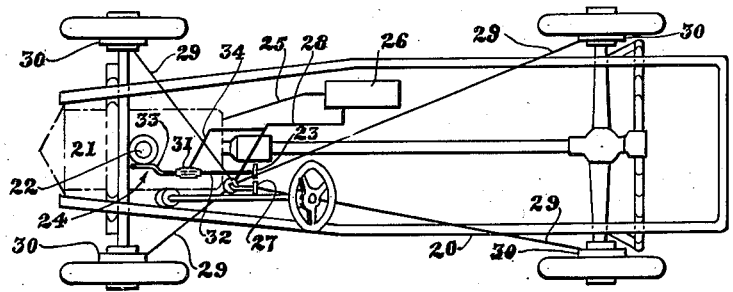
Fig. 1 is a schematic view showing a bus chassis, its pressure operated brake system and the relation of my invention to that system and to the throttle valve actuating means.

My invention may be most conveniently introduced by reference to Fig. 1 in which I have shown the chassis 20 of a bus or other vehicle having an engine 21 having a throttle valve controlled carburetor indicated at 22, an accelerator pedal 23 and linkage or equivalent means 24 to be actuated by the accelerator pedal 23 to vary the position of the throttle valve.

In motor vehicles having an air or like power or pressure operated brake system, the engine 21 conventionally operates means such as a compressor, which delivers air under pressure through the supply line 25 to build up and maintain the fluid under a desired pressure in the tank 26 which is the source of air or fluid under pressure. At 27, I have indicated a brake pedal effective, when actuated, to cause a flow of air under pressure through the pressure line 28 from the tank 26 through the supply lines 29 to the wheel brakes, indicated generally at 30.

The effectiveness of the braking system depends, of course, on the availability of adequate pressure and my invention is concerned with means for automatically making normal operation of the vehicle impossible except when an adequate brake operating pressure is available.

I accomplish this result by utilizing pressure operable means such as the device indicated generally at 31 only in Fig. 1 to connect a pair of members anywhere in the actuating means controlled by the accelerator pedal to vary the position of the throttle valve. In Fig. 1, I have shown for convenience the device 31 as connecting the members 32 and 33 of the linkage 24. The device 31 is connected to the source 26 by the pressure line 34 by means responsive to the pressure at the source when the pressure therein is at a predetermined minimum and is rendered effective by such pressure to connect the members 32 and 33 as a unit. Should the pressure in the tank 26 be below that predetermined minimum, the device 31 permits relative movement between the members 32 and 33 thereby to render normal acceleration impossible. For reasons that will subsequently be apparent, such relative movement, when the device 31 is inoperative, limits the extent to which the throttle valve can be opened by the actuation of the accelerator pedal 23.

Devices in accordance with my invention accordingly consist of pressure operable means such as a connecting unit rendered operable by air under pressure and means, responsive to a predetermined pressure, to render operable the connecting unit.

The actuation of the connecting unit also may be employed to actuate a switch in control of electric circuits, shown in Fig. 15, and discussed in connection therewith to further control the operation of the vehicle or its engine.

The device of Figs. 2–6

In Figs. 2–6, I have shown embodiments of my invention for use in connecting the members 32 and 33 of the linkage 24.

Figure 2:
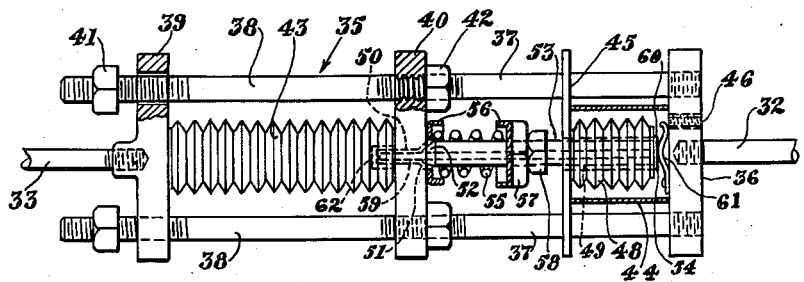
Fig. 2 is a partly sectioned view of a device combining a valve operable at a predetermined pressure and a pressure operated connecting unit for the throttle actuating members.

The device of Fig. 2 generally indicated at 35 comprises a head 36 into which is threaded one end of the rod 32 of the accelerator pedal actuated linkage 24. Threaded in the head 36 are a pair of rods 37 shouldered to establish a portion 38 of slightly greater diameter to slidably support a head 39. The portions 38 are also threaded to receive adjusting nuts 41 and 42 establishing respectively a stop for the head 39 and lock nuts for the head 40 through which the supports are threaded. A pressure responsive element such as the bellows unit 43 is attached to the heads 39 and 40 and to the head 39 I attach one end of the rod 33 of the throttle valve positioning linkage 24.

The head 36 has a cylinder 44, the head 45 of which is supported by the rods 37 and at 46 I have shown an inlet port into which the end of the pressure line 34 of Fig. 1 is threaded. The cylinder head 45 supports a bellows unit 48 which has an axial passage 49.

I form the head 40 with a port 50 tapered as at 51 to establish a seat for the tapered head 52 of the valve pin 53 which extends through the axial passage 49 of the bellows unit 48 with its flange 54 attached to the end thereof. At 55 I have shown a return spring urging the valve 52 into its unseated position. The spring 55 seats in guide cups 56 and is adjustably tensioned by the nut 57 backed by a lock nut 58. For the sake of clarity, I have omitted the nut receiving threads on the valve pin 53.

The valve pin 53 has an axial bore to receive the member 59 which has at one end a head 60 normally blocking the bore under the influence of the spring 61 attached to the head 36. The other end of the member 59 is disposed to engage with the seat 62 in the bellows unit 43 to effect the disengagement of the head 60 from the flange 54 when the valve head 52 engages the seat 51 to close the port 50.

By this construction, I provide a device that permits predetermined relative movement between the members 32 and 33 when the pressure at the source 26 is below a predetermined minimum. This results from the fact that the bellows unit 43 collapses unless its interior is subjected to a predetermined pressure.

Pressure within the cylinder 44 is the same as the pressure within the tank 26. When the pressure within the cylinder 44 reaches a predetermined minimum adequate for safe brake operation, the bellows unit 48 collapses and causes the valve pin 53 to move into a position in which its tapered head 52 closes the port 50 and the member 59 engages with the seat 62 to cause its head 60 to disengage from the flange 54 against the action of the spring 61. Air under pressure is, accordingly, admitted to the bellows unit 43 to prevent its collapse as the accelerator pedal is depressed so that the members 32 and 33 are connected as a unit.

Should the pressure in the tank 26 drop, for any reason, below the predetermined minimum, the bellows unit 48, because of its resiliency and because of the return spring 55, returns to its normal position unseating the head 52 to open the port 50 thereby to relieve the pressure in the bellows unit 43. At the same time, the member 59 is carried into a position in which its head 60 is tightly seated against the flange 54 by the spring 61.

Figure 3:
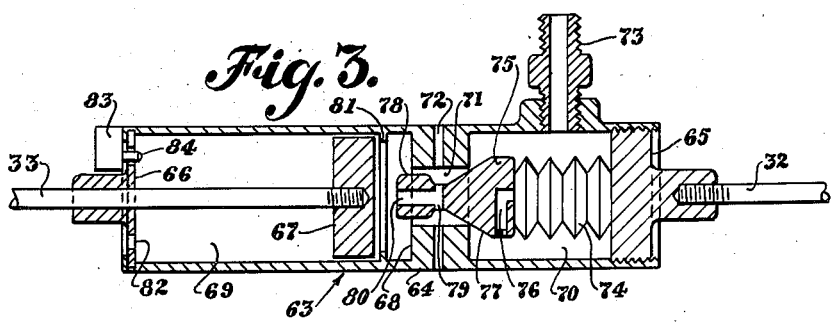
Fig. 3 shows, in a longitudinal section, a modification of the device shown in Fig. 2.

The device 63 of Fig. 3 follows the device 35 of Fig. 2 in that it combines a pressure operable connection and pressure operable means to render the connection operative. The device 63 comprises a casing 64 into one end of which is adjustably threaded an end wall 65 to which the member 32 is connected. The other end wall 66 slidably supports the member 33 which has a piston 67. The casing 64 has a partition 68 establishing a cylinder 69 for the piston 67 and a chamber 70. The cylinder 69 and the chamber 70 are interconnected by a port 71 having radially disposed relief passages 72. At 73, I have indicated a fitting for the pressure line 34 so that pressure in the tank 26 is transmitted to the chamber 70.

Fastened at one end to the wall 65 is a bellows unit 74 closed at its other end by a plug 75 having a sealed passage 76 through which the bellows unit 74 was initially inflated to the desired pressure. The plug 75 has a tapered valve portion 77 to seat normally in the port 71 to close the cylinder 69 from the chamber 70. The extremity 78 of the plug 75 is of the same diameter as the port 71 (in the drawings, working clearances are exaggerated) and between the extremity 78 and the tapered portion 77, the plug 75 is of reduced diameter and has ports 79 communicating with an axial bore 80 extending through the extremity 78.

By this construction, when the pressure in the tank 26 reaches a predetermined minimum, the resistance of the bellows unit 74 is overcome unseating the valve portion 77 so that the extremity 78 blocks the relief ports 72. When the plug 75 is thus positioned, air under pressure flows from the chamber 70 through the ports 79 and 80 into the cylinder 69 against the piston 67 to carry the piston out of contact with the limiting ring 81 against the end wall 66 to extend the member 33 relative to the member 32 and connect them as a unit to render the connection operable to provide normal acceleration.

The end wall 66 has relief ports 82 and the casing 64, adjacent one of the relief ports 82, supports a normally open switch 83 with a switch closing button 84 extending through one of the relief ports for actuation by the piston 67 as it seats against the end wall 66. The switch 83 is employed to provide an automatic control of the ignition circuits of the engine and has the same function as the switch 152 of Fig. 15 or the switch 94 of Fig. 16.

When the pressure at the source is not adequate for safe brake operation, the bellows unit 74 causes the valve portion 77 to seat blocking the cylinder 69 from the chamber 70 and venting the cylinder 69 through the ports 80, 79, and 72.

The device of Fig. 3 is particularly well adapted for use in buses or like vehicles because of its simplicity of construction and because of its reliability. In addition, it should be noted that the only possibility of failure is the possibility that the bellows unit 74 might develop a leak. As this would result in a balancing of pressures, the bellows unit 74 would not move and accordingly the device would remain inoperative and thereby prevent normal acceleration until the unit 74 was repaired or replaced regardless of available brake operating pressure. Such failure of the device on the "safe side" is a desirable characteristic of my invention.

Figure 4:
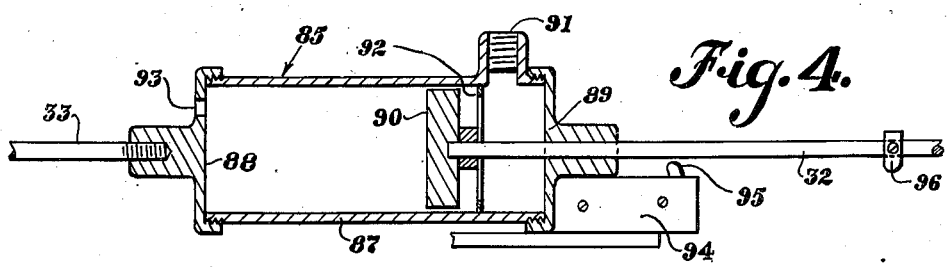
Fig. 4 is a longitudinal section of a connecting unit in accordance with my invention for connecting a pair of throttle valve actuating members when the throttle valve is opened by a pull motion on the interconnected members.
Figure 6:
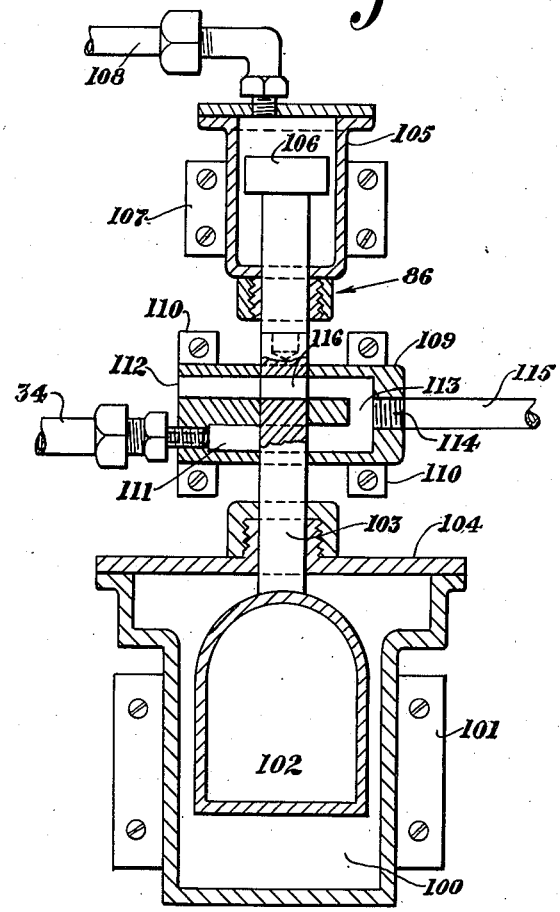
Fig. 6 is a vertical section of a valve operated at a predetermined pressure for use with the connecting units shown in Figs. 4 and 5.

In Fig. 4, I have shown a connecting unit 85 for use with a pressure operable valve, such, for example, as the valve 86 of Fig. 6. The unit 85 comprises a cylinder 87 to the end 88 of which the member 33 is connected. The other cylinder end 89 slidably receives the member 32 which has a piston head 90 within the cylinder 87. A port 91 is adapted to receive the connection 115 from the valve 86 and adjacent the port 91 I provide a stop 92 to limit the stroke of the piston.

The connecting unit 85 is for use where that part of throttle linkage in which the members 32 and 33 are located exerts a pull when the accelerator pedal 23 is depressed by the vehicle operator. The position shown in Fig. 4 is the inoperative position in which the member 32 has moved relative to the member 33 substantially as far as possible and in such movement, the position of the throttle valve has not been varied. Further movement of the accelerator pedal 23 will cause movement of the throttle valve, but because of the relative movement between the members 32 and 33, only a limited opening of the throttle valve is possible when inadequate brake operating pressures are available.

When the pressure at the source 26 is at or above a predetermined minimum, pressure is admitted into the cylinder 87 and it moves the piston head 90 against the end wall 88 of the cylinder 87 thereby to connect the members 32 and 33 so that they move as a unit to make possible the normal range of acceleration. The end wall 88 has a relief port 93 and the cylinder 87 carries a normally open switch 94 having its operating button 95 disposed to be engaged by the dog 96 fast on the member 32 thereby to close the switch 94 when the members 32 and 33 are connected as a unit.

Figure 5:
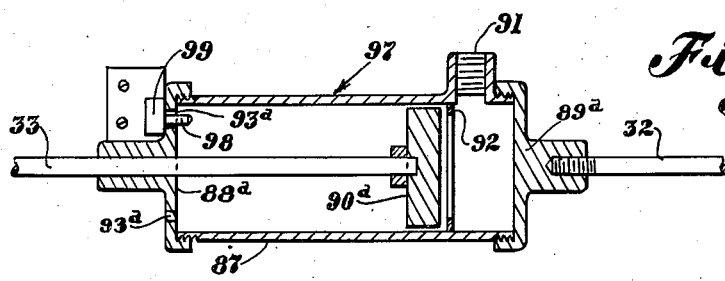
Fig. 5 is a similar view of a modification of the connecting unit shown in Fig. 4 for use when the opening of the throttle valve is attended by a push on the interconnected members.

The connecting unit 97 of Fig. 5 is, in general, similar to the connecting unit 85 of Fig. 4, but is adapted for use when that part of the linkage 24 in which the members 32 and 33 are located exerts a thrust or push when the accelerator pedal 23 is depressed. It includes the cylinder 87 having a port 91 to receive the conduit 115 from the valve 86 when the pressure at the source is at or above a predetermined minimum. Adjacent the port 91, the cylinder 87 has the stop ring 92. The member 32 is fastened to the end 89ᵃ of the cylinder 87 while the member 33 is slidably supported by the end 88ᵃ and carries a piston head 90ᵃ within the cylinder 87 for movement between a position engaging the end 88ᵃ and a position engaging the stop ring 92. At 93ᵃ, I have indicated a relief port through the wall 88ᵃ through which extends the operating button 98 of a normally open switch 99 having the same function as the switch 94 of Fig. 4.

The operation of the unit 97 is similar to the operation of the unit 85 of Fig. 4. When the pressure at the source 26 is adequate to ensure the safe operation of the brakes, the valve 86 admits air under that pressure into the cylinder 87 thereby to seat the piston 90ᵃ against the end 88ᵃ simultaneously to extend the members 32 and 33 to make normal acceleration possible and to effect the closing of the switch 99. When an inadequate brake operating pressure exists in the tank 26, the valve 86 connects the cylinder 87 to relief and if the accelerator pedal 23 is then depressed, relative movement between the members 32 and 33 results, decreasing the extent to which the throttle valve can be opened by depressing the accelerator pedal 23 and permitting the switch 99 to open.

The valve 86 of Fig. 6 is particularly well adapted for use with the control units 85 and 97. The valve 86 has a mercury well 100 supported by a bracket 101. Within the well 100, there is a float 102 having a stem 103 extending through the well cover 104 upwardly into a cylinder 105 where the stem is provided with a piston head 106. The cylinder 105 is shown as supported by brackets 107. Air under pressure is supplied to the cylinder 105 by a pressure line 108 connected to the tank 26 so that the pressure in the tank 26 is opposed by the float 102 and when that pressure reaches a predetermined minimum, the stem 103 is forced downwardly.

I have indicated at 109 a valve body supported as by brackets 110 and slidably receiving the stem 103. The valve body has a port 111 to receive air under pressure from the pressure supply line 34 and a relief port 112. The ports 111 and 112 are blocked by the stem 103 from the chamber 113 which has a port 114 for the conduit 115 through which air under pressure is delivered to or from the port 91 in the cylinder 87 of the unit 85 or 97.

The stem 103 has a transverse bore 116 shown as connecting the chamber 113 to the relief port 112 but adapted to connect the port 111 to the chamber 113 when the predetermined pressure on the piston 106 overcomes the resistance of the float 102.

The device of Figs. 7–14

The embodiment of my invention shown in Fig. 7 is utilized to connect the members 117 and 118 of the throttle valve actuating means 24.

The member 117, as shown in Fig. 7, is the shaft for the indicated throttle valve 119 and fast on the shaft is an arm 120 controlled conventionally by the spring 121 urging the valve 119 into its closed position. The member 118 constitutes an arm loosely mounted on the shaft 117. The arms 118 and 120 have hub portions 122 and 123 respectively (see Figs. 8 11, and 12) each of which has a radially disposed slot 124 (see Figs. 9, 11, and 12). The hub 122 is cut away to establish a pair of spaced shoulders 125 and 126 engageable by a pin 127 carried by the hub portion 123 (see Fig. 8) so that predetermined partial rotation of the arm 118 is independent of the shaft 117 until the pin 127 is engaged by the shoulder 125. By this construction, I provide a connection restricting the extent to which the throttle valve 119 may be opened by the accelerator pedal 23 and I provide means operated by the accelerator pedal or like control to connect the arm 118 to the shaft 117 as a unit when the fluid pressure at the source is at or above a predetermined minimum.

As illustrative of such means, I form a sleeve 128 with a bore 129 of the diameter of the hubs 122 and 123 laterally extended to permit the sleeve 128 to be shifted transversely relative to their axis. The sleeve 128 has rib portions 130 and 131. The rib portion 131 always remains in the slot 124 of the hub 123 to cause the sleeve 128 to rotate with the shaft 117. The rib portion 130 is disengaged from the slot 124 of the hub 122 when the sleeve 128 is in the position shown in Fig. 9 thereby to permit the arm 118 to turn relative to the shaft 117. When the sleeve is in the position shown in Fig. 10, the rib portion 130 enters the slot 124 of the hub 122 thereby connecting the arm 118 and the shaft 117 as a unit.

In accordance with my invention, I employ a sleeve 132 within which the sleeve 128 is free to rotate. Into the sleeve 132 I thread a rod 133 on a hub 134 threaded into a carrying housing 135.

At 136 I have indicated a power operable unit to move the housing 135 and the sleeve 132 as a unit to render the connecting unit operable or inoperable to permit or prevent normal acceleration. The unit 136 consits of a casing 137 having a chamber 138 having an adjustable end wall 139 and an axial port 140, vented by radial relief passages 141.

A fitting 143 for the pressure line 34 establishes a port through which air under pressure is admitted into the chamber 138. A bellows unit 144 supported at one end by the wall 139 is closed at its other end by a plug 145 having a sealed passage 146 by which the bellows unit 144 was initially inflated to a desired pressure. The plug 145 tapers at 147 to normally close the port 140 under the influence of the bellows unit 144.

The extremity 148 of the plug 145 is cylindrical and is dimensioned to fit the port 140 so that when the pressure in the tank 26 and accordingly the pressure in the chamber 138 reaches a predetermined minimum, and the resistance of the bellows unit 144 is overcome to unseat the tapered port 147 thereby to open the port 140, the relief ports 141 are blocked by the cylindrical portions 148.

The cylinder 137 has a hub 149 (see Fig. 13) having an axial passage to slidably receive the rod 150 threaded at one end into the plug extremity 148 and at its other end into the support 151 for the normally open switch 152. The support 151 carries the housing 135. By this construction, as the plug 145 is unseated by the collapse of the bellows unit 144, the housing 135 is moved therewith exerting a pull on the sleeve 132 through the rod 133.

The rod 150 has an axial bore to receive the switch closing button or stem 154 and is slotted as at 155 to receive the pin 156 carried by the hub 149. The pin 156 traverses the bore in such relation to the switch closing stem 154 that as the housing 135 is moved to cause the members 117, 118, and 120 to be interconnected as a unit to permit normal acceleration, the stem 154 engages the pin 156 and causes the switch 152 to close.

Figure 14:
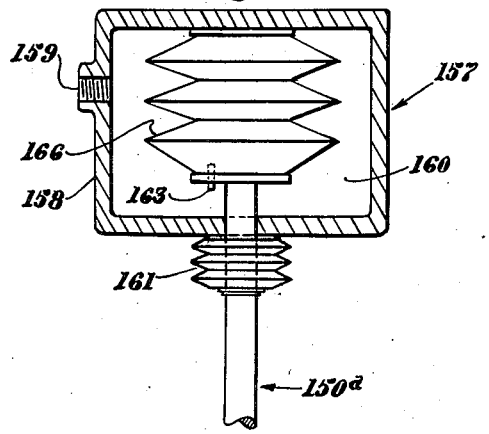
Fig. 14 is a fragmentary, partly sectioned view of a modification of the power operated means of the device of Fig. 7.
Figure 13:
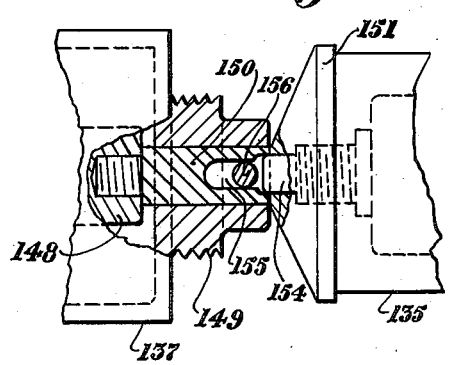
Fig. 13 is a fragmentary sectioned view of the unit of Fig. 7.

In Fig. 14, I have indicated a power operable unit 157 adapted for use in place of the unit 136 of Fig. 7. The unit 157 comprises a casing 158 having a threaded port 159 to receive the end of the pressure line 34 to deliver air under tank pressure into the chamber 160. One end of a bellows unit 161 is fastened to the casing 158 and has an axial passage for the rod 150a to which the other end of the bellows unit is secured. The rod 150a is slidable in the casing 158. At 166, I have shown a bellows unit fastened at one end to the casing 158 and at its other end to the shaft 150a. The unit 166 is initially inflated to a predetermined value and sealed as at 163. The bellows unit 161 serves as a shaft seal and is of relatively small size. It will be apparent that when a predetermined pressure exists in the chamber 160 the bellows unit 166 collapses moving the rod 150a through a sufficient stroke to interconnect the members 117, 118, and 120 as a unit.

The installation of Figs. 15 and 16

In Fig. 15, I have indicated schematically a wiring diagram of an installation in accordance with my invention.

At 167 and 168, I have indicated a battery and generator respectively as the conventional source of electrical energy of a motor vehicle. The lead 169 includes the ignition switch 170 adjacent the dash board 171. At 172 I have indicated a horn as illustrative of conventional warning signals and at 173 I have suggested the ignition coil as representative of the engine circuits.

At 174 I have indicated a circuit from the ignition switch 170 having parallel switches 175 and 176. In the position shown in the drawings, the switch 175 connects the circuit 174 to the horn 172 and the switch 176 connects the circuit 174 to the lead 177, the contact 178 of which is engageable by a switch 179 to close the circuit 174 to the ignition coil 173. The switch 179 is shown as normally engaging a contact 180 in a lead 181 to the contact 182.

In order to make it possible to start the engine without sounding the horn 172, I control the switches 175 and 176 by a relay 183 energized by the circuit 184 when the parking brake 185 is applied to close the normally open switch 186 and the ignition switch 170 is turned on. When the relay 183 is thus energized, the switch 175 is positioned to disconnect the horn 172 from the circuit 174 and to engage the contact 187 connected by the lead 188 to the switch 189.

Before the ignition coil 173 can be energized to permit the engine to be started, it is necessary to position the switch 179 to engage the contact 178. To accomplish this, I employ a relay 190 which may be energized by manually holding the push button switch 191 in a position to connect the circuit 192 to the lead 169 and thereby position the switch 179 to complete the circuit to the ignition coil. The circuit 195 then includes the switch 196 in its shown position, the lead 177 to the contact 178 and the switch 179.

When the relay 190 is energized, it also closes the switch 193 connected by the lead 194 to the switch 189 so that the circuit 174 becomes a holding circuit maintaining the relay 190 energized on the release of the push button switch 191 so long as the relay 199 is de-energized and the relay 183 is energized. The holding circuit consists of the circuit 174, the switch 175, the lead 188, the switch 189, the lead 194, and the switch 193.

In its released position, the push button switch 191 connects the power lead 195 to the lead 169 and to the lead 177 when the switch 196 is closed in the position shown which is its normal position when the relay 199 is deenergized.

As the circuit to the ignition coil 173 is complete when the relays 183 and 190 are energized, the engine may be started.

At 197, I have indicated generally a device in accordance with my invention of the type shown in Fig. 7. This has its switch 152 in control of a circuit 198 to the relay 199 and to a pilot light 200 on the dash board 171.

Until the air pressure in the tank 26 is at a predetermined minimum adequate for safe operation of the brakes, the members 117, 118, and 120 are not interconnected until after predetermined partial rotation of the member 118 relative to the member 117 so that the extent to which the throttle valve may be opened by actuation of the accelerator pedal is greatly reduced. Adequate acceleration of the engine is possible for warming it up and for building up a desired air pressure in the tank 26, but such acceleration permits the vehicle to be driven at only a slow speed. Furthermore, under the conditions being discussed, the parking brake 185 is applied.

When such air pressure is available, the device 197 is operative to connect the members 117, 118, and 120 to make normal acceleration possible and simultaneously the switch 152 is closed so that the relay 199 is energized. The operator may then release the brake 185. Should he release the brake 185 prematurely, the relay 183 would be deenergized breaking the holding circuit for the relay 190 and completing the circuit to the horn 172 and at the same time opening the circuit to the ignition coil 173.

When the relay 199 is energized, the switch 189 engages the contact 182 of the lead 181 thereby also opening the holding circuit to the relay 190. At the same time, the relay 199 positions the switch 196 to engage the contact 201 maintaining the relay 183 energized. The circuit to the ignition coil 173 then comprises the power line 174, the switch 175, the lead 188, the switch 189, the lead 181 to the contact 180, and the switch 179.

Should the pressure in the tank 26 drop below the predetermined minimum, the switch 152 opens breaking the circuit to the relay 199 and to the pilot light 200. As a result, the holding circuit for the relay 183 is opened and the circuit to the ignition coil is also opened so that the compression of the engine has a braking effect on the vehicle. As the relay 183 is no longer energized, the circuit 174 is also complete to the horn 172 through the switch 175 and the horn accordingly sounds. I have shown a safety switch 202 in the circuit 198 to permit this control of the motor vehicle. Such safety switches may be located any place in the vehicle desired to provide maximum safety and are normally open switches held closed under glass as at 203 or by emergency door latches.

Should the pressure in the tank 26 fail at a time when or under circumstances that makes it necessary to move the vehicle without waiting for adequate brake operating pressure to be built up or a broken line, for example, to be repaired, this may be done. It will be noted that one of the functions of the relay 183 is to enable the horn 172 to be disconnected from the circuit 174 and to establish a holding circuit for the relay 190. The circuit 184 controls the relay 183 directly and the circuit 198 controls the relay 199 which, when energized, establishes the holding circuit for the relay 183 when the switch 196 engages the contact 201. By manually holding the switch 191 to close the circuit 192 to the relay 190, the relay 190 may be held closed to position the switch 179 to include the ignition coil 173 in the circuit 174 with the horn 172. The circuit 174 then includes the switch 196, the lead 177 to the contact 178 and the switch 179. As the device 197 is inoperative to establish a normal range of acceleration, the vehicle may only be driven at a slow speed. Should an attempt be made to hold the switch 191 closed when adequate brake operating pressure exists at the source 26, the circuit to the relay 199 is closed, but the circuit 195 is open. As the circuit 195 supplies the energy for the holding circuit from the relay 183, the ignition circuit is interrupted after which the horn circuit is energized.

In Fig. 16, I have indicated a device of the type shown in Figs. 2-6. For example, I have shown the device 85 of Fig. 4 having its switch 94 in control of the circuit 198.

*Conclusion*

From the foregoing, it will be noted that my invention makes possible the safe control of motor vehicles equipped with brakes operated by air under pressure. As will be apparent from the modification of my invention shown in the drawings, I have minimized the use of springs and the like which might tend to break or become so fatigued in use as to interfere with reliability in operation. It will also be apparent that I have made it difficult to tamper with the device and have provided that any failures of the device to operate will be in the direction of safety.

What I therefore claim and desire to secure by Letters Patent is:

1. A control device for use in a vehicle having a pressure operated brake system including a source of fluid under pressure, a throttle valve controlled engine driving means developing and maintaining fluid under pressure at said source, and accelerator pedal actuated means to control said throttle valve and having a pair of members to be connected, said control device comprising pressure operable means normally interconnecting said pair of members to provide relative movement therebetween to limit the extent to which said throttle valve can be opened by said pedal, said means being operable to connect said pair of members to increase the extent to which the throttle valve can be opened by actuating said pedal, and means responsive to a predetermined pressure at said source to deliver fluid under pressure to said pressure operable means to render it operable.

2. The control device of claim 1 and a control circuit including a normally open switch closed when the pressure operable means are rendered operable.

3. The control device of claim 1 in which the means responsive to a predetermined pressure at the source comprise a cylinder, a mercury well, a float in the well, a piston in the cylinder, a valve body, a stem interconnecting the float and the piston and slidable in the body, means to deliver fluid from the source to the cylinder, the valve body having first and second ports, one of the ports constituting a relief port, and means connecting the other of the ports to the source, and a third port connected to the pressure operable means, and the stem has a passage normally interconnecting the relief and third ports but operative to interconnect the second and third ports when the fluid pressure against the piston moves the stem against the influence of the float.

4. In a vehicle having an engine controlled by a throttle valve and a brake operating system having a source of power developed and maintained by means driven by the engine, a first member connected to said throttle valve, a second member to be actuated by the operator of the vehicle, and pressure operated means responsive to predetermined pressure at said source to connect said members as a unit, said means having an inoperative position in which movement of said second member is relative to said first member.

5. A unit to connect a pair of members of the accelerator pedal actuated means in control of the throttle valve of a vehicle engine, said unit comprising a cylinder connected to one of said members, a pressure responsive element connected to the other of said members and mounted within said cylinder for movement between a first position in which only a predetermined partial movement of the throttle valve results from the actuation of said pedal and a second position in which the extent to which said throttle valve may be opened by actuation of said pedal is increased, said cylinder having a port through which element operating fluid under pressure is admitted to operate said pressure responsive element and to carry it into said second position.

6. The unit of claim 5 in which a normally open switch is closed by the operation of the pressure responsive element.

7. A control device for use in a vehicle having a pressure operated brake system including a source of fluid under pressure, a throttle valve controlled engine driving means developing and maintaining fluid under pressure at said source, and accelerator pedal actuated means to control said throttle valve and having a pair of members to be connected, said control device comprising a connection between said members movable between a first position in which relative movement between said members is permitted thereby to limit the extent to which said throttle valve can be opened by said pedal, and a second position in which said members are interconnected as a unit, pressure operable means in control of said connection normally maintaining said connection in its first position, and means responsive to a predetermined pressure at said source to deliver fluid under pressure to said pressure operable means to actuate it to establish said second position of said connection.

8. A control device for use in a vehicle having a pressure operated brake system including a source of fluid under pressure, a throttle valve controlled engine driving means developing and maintaining fluid under pressure at said source, and accelerator pedal actuated means to be connected to the shaft of said valve, said device comprising a connecting unit comprising an arm connected to said means and mounted on said shaft for rotation independently thereof, and means to connect said arm to said shaft, said means having a first position normally limiting the extent to which said arm rotates relative to said shaft and a second position in which said arm and said shaft are connected as a unit, and pressure operable means connecting said unit and being normally operative to maintain said connecting means in said first position, said pressure operable means being responsive to a predetermined pressure at said source to effect said second position of said connecting means.

9. The control device of claim 8 in which the pressure operable means includes a casing, a member movable relative thereto under the influence of the predetermined pressure and a normally open switch carried by the member to be closed on relative movement of the member.

10. The control device of claim 8 in which the pressure operable means comprises a casing having a chamber and a port to admit fluid under pressure from the source and a hub, a bellows unit mounted in the chamber, a rod carried by said unit and slidably supported in the casing, and a second bellows unit sealed to the hub and to the shaft and being of smaller size than the first named bellows unit.

11. The control device of claim 8 in which the pressure operable means comprises a casing having a chamber, a port to admit fluid under pressure from the source to the chamber, an axial port, and relief ports connected to the axial port, a bellows unit mounted in the first chamber, and means carried by the bellows unit and connected to the connecting unit, the connecting means comprising a valve portion normally blocking the axial port to seal the first chamber, and a second valve portion blocking the relief ports when the axial port is unblocked.

12. A control device for use in a vehicle having a pressure operated brake system including a source of fluid under pressure, a throttle valve controlled engine driving means developing and maintaining fluid under pressure at said source and accelerator pedal actuated means to control said throttle valve to be connected to the throttle valve shaft, said shaft and said device comprising a unit comprising a spring controlled arm fast on said shaft, an arm connected to said means and mounted on said shaft for rotation independently thereof, both of said arms having slotted hubs, a projection carried by one of said hubs, the other of said hubs having a pair of spaced shoulders to receive said projections between them and to be engaged thereby to limit the independent rotation of said second arm relative to said shaft, a sleeve having a bore to receive said hubs, said bore being transversely extended to permit said sleeve to be shifted transversely relative to the axis of the shaft between first and second positions and having a pair of slot entering projections, one of said projections remaining entrant of the slot in the hub of said first arm in said first or second positions and the other of said projections being entrant of the slot in the hub of said second arm only when said sleeve is in said second position, a second sleeve rotatably receiving said first sleeve, and power operated means responsive to the pressure at said source and connected to said second sleeve to move said first sleeve into said second position to connect said second arm and said shaft as a unit.

13. A control device for use in a vehicle having a pressure operated brake system including a source of fluid under pressure, a throttle valve controlled engine driving means developing and maintaining fluid under pressure at the source, and accelerator pedal actuated means to be connected to the valve to control its position and having a pair of members, said device comprising a connecting unit connecting said pair of members, said unit having a first position in which predetermined relative movement between said members results on the actuation of said pedal and a second position in which said members are connected as a unit, and pressure operable means, said pressure operable means comprising a casing, a pressure responsive element in said casing, a member connected to said element and slidably supported by said casing, said member having an axial bore and a slot transversely interconnecting said bore, a pin carried by said casing to extend through said slot, a housing connected to said member and to said unit, and a normally open switch in said housing, said switch including an operating stem extending into said bore to engage with said pin to close said switch when a predetermined pressure actuates said element to move said member relative to said casing.

14. A control system for motor vehicle having fluid pressure operated brakes and a source for fluid under pressure, a parking brake, a throttle valve controlled engine driving means developing and maintaining fluid under pressure in said source and having an ignition circuit and electrically operated signalling means operator actuated means connected to the throttle valve and having a first position in which only a predetermined partial opening of said valve can be effected by the operator and a second position in which the extent to which the throttle valve may be opened by the operator is increased, said system comprising first, second and third relays, first and second switch means operated by each of said relays, a circuit to each of said relays, first and second power circuits, first and second holding circuits, first and second leads to connect the power circuit to the ignition circuit, and a lead to the signalling means, said first holding circuit including said first relay, first switch means of said first relay, second switch means of said second relay and second switch means of said third relay to connect said first holding circuit to said first power circuit when said first and second relays are energized and said third relay is de-energized, said second holding circuit including said second relay and first switch means of said third relay to connect said second holding circuit to said second power circuit when said third relay is energized, said first connecting lead including the second switch means of said first relay, said second switch means of said second relay and second switch means of said third relay when said second and third relays are energized, and said first relay is de-energized thereby to connect said first lead to said first power circuit, a third lead in parallel with said switch means of said first lead including said first switch means of said second relay and said second switch means of said first relay when said second relay is de-energized and said first relay is energized, said second lead includes said first switch means of said third relay and said second switch means of said first relay when said third relay is de-energized and said first relay is energized, said lead to the signalling means being closed by said second switch means of said second relay when de-energized, a normally open switch in said circuit to said second relay closed by said parking brake when applied, a switch normally closing said second power line but operable manually to open said power line and to close said circuit to said first relay, and a normally open switch in said third relay circuit and means responsive to the pressure at said source to close said switch and to establish said second position of said operator actuated means.

15. The control system of claim 14 in which the circuit to the third relay includes at least one normally open switch, and releasable means normally holding the switch closed.

16. The device of claim 1 in which the means responsive to a predetermined pressure at the source comprise a cylinder, a piston in the cylinder, a valve body, a stem connected to the piston and slidable in the body, means to deliver air from the source to the cylinder, the valve body having first and second ports, one of the ports constituting a relief port, means connecting the other of the ports to the source, and a third port connected to the pressure operable means, said stem having a passage normally connecting the relief and third ports, and yieldable means supporting the stem and operative to permit its movement to interconnect the second and third ports when the fluid pressure against the piston moves the stem against its yielding action.

HAROLD T. HIGGINS.

(References on following page)

REFERENCES CITED

The following references are of record in the file of this patent:

UNITED STATES PATENTS

| Number | Name | Date |
|---|---|---|
| 1,620,764 | Hull | Mar. 15, 1927 |
| 1,864,225 | Williams | June 21, 1932 |
| 2,011,651 | Puffer | Aug. 20, 1935 |
| 2,189,221 | Paine et al. | Feb. 6, 1940 |
| 2,362,723 | Sanford | Nov. 14, 1944 |
| 2,372,842 | Mossinghoff | Apr. 3, 1945 |